Maillefert & Hayden.
Building.

N° 41,078. Patented Jan. 5, 1864.

Witnesses:

Inventors:
Benjamin Maillefert
Lin. Hayden

UNITED STATES PATENT OFFICE.

BENJAMIN MAILLEFERT AND LEVI HAYDEN, OF NEW YORK, N. Y.

IMPROVED DIVING-ROOM FIXED AT THE END OF A VESSEL.

Specification forming part of Letters Patent No. 41,078, dated January 5, 1864.

*To all whom it may concern:*

Be it known that we, BENJAMIN MAILLEFERT and LEVI HAYDEN, both of the city, county, and State of New York, have invented a new and useful improvement in vessels for removing torpedoes or other sunken obstructions from harbors, rivers, and channels; and we do hereby declare that the following is a full, clear, and exact description of the same, reference being had to the accompanying drawings, making a part of this specification, in which—

Figure 1:
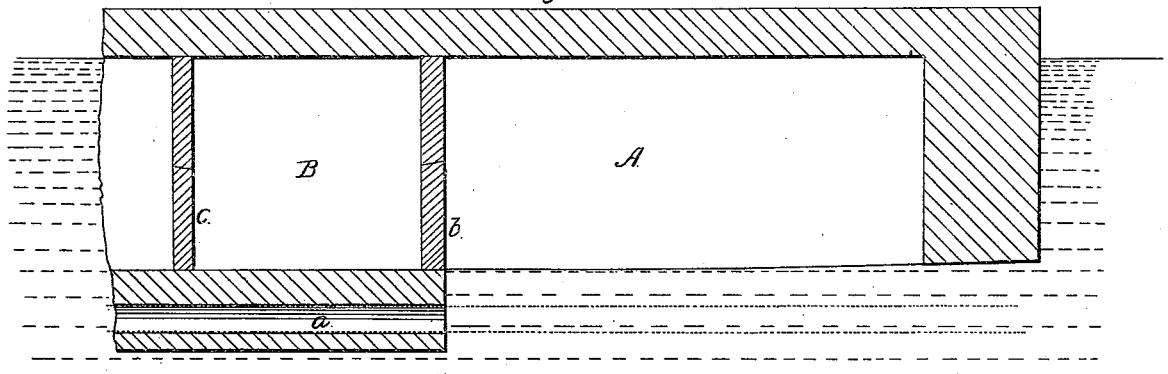
Figure 2:
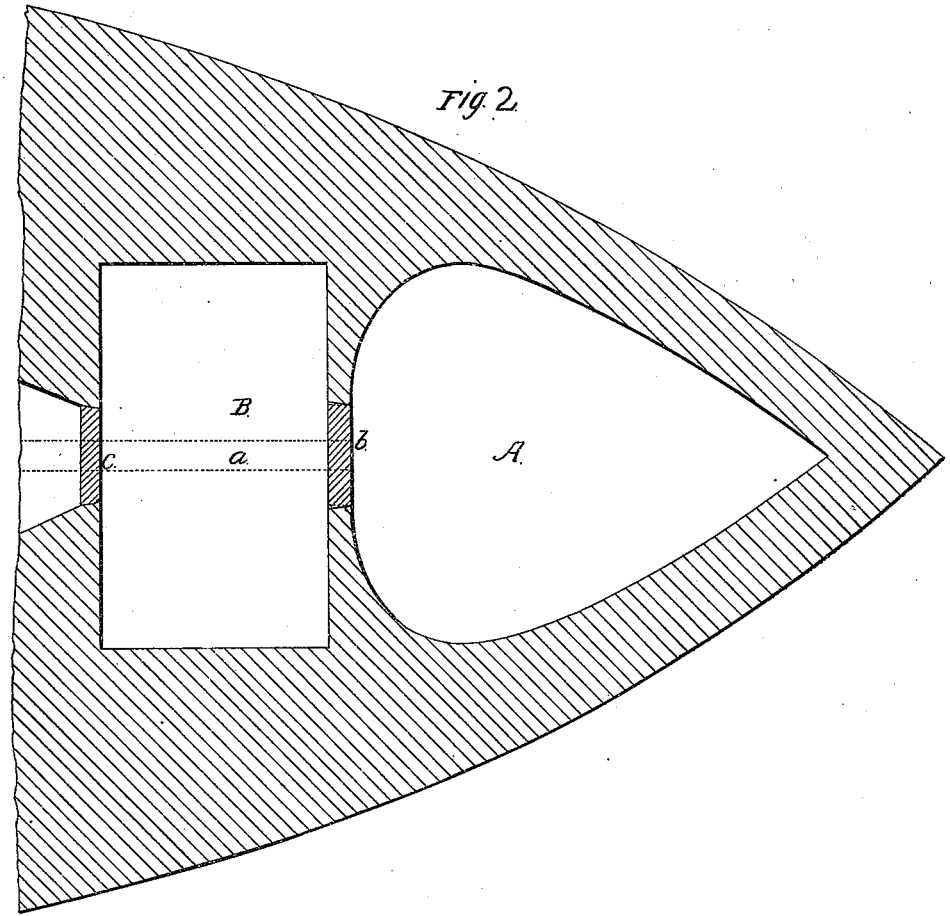

Figure 1 is a central vertical section of the forward part of a vessel. Fig. 2 is a horizontal section of the same.

Similar letters of reference indicate corresponding parts in both figures.

This invention consists in providing, in the interior of a vessel propelled by steam, sails, or other means, a fixed working chamber with an open bottom, and into which air is compressed, as in a diving-bell, to permit persons to operate within it below the surface of the water, so as to be protected (by the water) from an enemy's projectiles.

It also consists in the combination, with such chamber, of an air-lock so arranged below the surface of the water as to permit persons to pass through it on their way to and from the working-chamber.

To enable others skilled in the art to construct and use our invention, we will proceed to describe it with reference to the drawings.

We propose generally to apply our invention on board a vessel of the "monitor" class or an armor-plated vessel of light draft. The working-chamber A should, for greater convenience of operation, be arranged immediately at the end of a vessel, and is made air-tight at its top and sides, but open at the bottom to the water, said bottom being on a level with or at a convenient distance above the level of the bottom of the vessel. In the example represented the bottom of the chamber is sufficiently above the bottom of the vessel to allow the passage under it of a boom, which is shown in red outline, and which works through a horizontal passage, *a*, formed in the bottom of the vessel, the said boom being intended to carry out to a suitable distance beyond the end of the vessel "canisters" of gunpowder for blowing up pilings or other solid obstructions, or to be furnished with hooks or other grappling apparatus for tearing away torpedoes, chains, or other obstructions, which can be torn away by the propulsion of the vessel in a proper direction, the said boom to be worked by men within the chamber A. This chamber may be also used for making examinations of the channel or for placing charges of gunpowder or for applying other means of removing obstructions than those above mentioned.

To permit men to operate within the said chamber below the water-line, the chamber is supplied with compressed air by air-pumps or other means, by which the level of the water within it is depressed below the natural level outside of the vessel.

To provide for the entrance and exit of men to and from the said working-chamber without coming on deck, we arrange the air-lock B behind or on one side of the chamber A, with an air-tight door or man-hole, *b*, between it and the chamber, and a similar door or man-hole, *c*, between it and the interior of the vessel. When the working-chamber is not being used, the door or man-hole *b* is closed. When persons desire to enter the working-chamber, they enter the air-lock by the door or man-hole *c*, and then close it, and afterward open the door or manhole *b* to enter the working-chamber. On leaving this working-chamber and passing into the air-lock, they close the door or man-hole *b* before opening *c*. This air-lock is like that used in many diving-bells, except that it is arranged on a level with instead of below the bell or working-chamber.

What we claim as our invention, and desire to secure by Letters Patent, is—

1. Providing a vessel with a fixed working-chamber, A, substantially as and for the purpose herein described.

2. The air-lock B, arranged in relation to the working-chamber A, substantially as and for the purpose herein specified.

BENJAMIN MAILLEFERT.
LEVI HAYDEN.

Witnesses:
THOS. S. J. DOUGLAS,
GEO. W. REED.